(12) United States Patent
Bradbury et al.

(10) Patent No.: US 9,395,961 B1
(45) Date of Patent: Jul. 19, 2016

(54) FINGERPRINT-BASED CODE VERSION SELECTION

(71) Applicant: International Business Machines Corporation, Armonk, NY (US)

(72) Inventors: Jonathan D. Bradbury, Poughkeepsie, NY (US); Giles R. Frazier, Austin, TX (US); Michael Karl Gschwind, Chappaqua, NY (US); Christian Jacobi, West Park, NY (US); Anthony Saporito, Highland, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/960,534

(22) Filed: Dec. 7, 2015

(51) Int. Cl.
*G06F 9/45* (2006.01)
*G06F 9/44* (2006.01)

(52) U.S. Cl.
CPC . *G06F 8/443* (2013.01); *G06F 8/71* (2013.01)

(58) Field of Classification Search
CPC .......... G06F 8/443; G06F 8/71; G06F 8/4434
USPC .................................................. 717/153, 122
See application file for complete search history.

(56) References Cited

U.S. PATENT DOCUMENTS

| 7,493,388 | B2 * | 2/2009 | Wen | G06F 9/50 |
| | | | | 705/28 |
| 8,782,613 | B2 | 7/2014 | Hines | |
| 2003/0200304 | A1 * | 10/2003 | Thorpe | G06Q 10/10 |
| | | | | 709/224 |
| 2013/0054942 | A1 * | 2/2013 | Serrano | G06F 11/3612 |
| | | | | 712/234 |

FOREIGN PATENT DOCUMENTS

CN 101976318 A 2/2011

* cited by examiner

*Primary Examiner* — Anna Deng
(74) *Attorney, Agent, or Firm* — Cantor Colburn LLP; William A. Kinnaman, Jr.

(57) ABSTRACT

Embodiments relate to fingerprint-based code version selection. An aspect includes based on a call to a method being issued by calling software that is currently executing on a processor of a computer system, determining a fingerprint comprising a representation of a sequence of behavior that occurs in the processor while the calling software is executing. Another aspect includes, based on determining that the match for the fingerprint is located in the entry in the fingerprint table, executing the associated code version of the method. Another aspect includes, based on determining that no match for the fingerprint is located in any entry in the fingerprint table: determining a new code version of the method by a compiler of the computer system; storing the fingerprint with an identifier of the new code version in a new entry in the fingerprint table; and executing the new code version.

20 Claims, 4 Drawing Sheets

FINGERPRINT-BASED CODE VERSION SELECTION

BACKGROUND

The present invention relates generally to code version selection in a computer system, and more specifically, to fingerprint-based code version selection.

During execution of computer software, the best version of code to execute for a particular method may vary depending on the task that is being performed when the method is called. For example, the optimal code version of a method that computes a function of a very large array variable may not be the same as the optimal code version of the method when the array variable is relatively small. Therefore, if the code for the method is optimized by the compiler into a first code version during a first call of the method, there is no guarantee that the same code version of the method will be good for subsequent calls to the method, because subsequent calls may be performed in different contexts or receive variables of different sizes.

SUMMARY

Embodiments include a method, system, and computer program product for fingerprint-based code version selection. An aspect includes based on a call to a method being issued by calling software that is currently executing on a processor of a computer system, determining a fingerprint of the calling software, the fingerprint comprising a representation of a sequence of behavior that occurs in the processor while the calling software is executing. Another aspect includes determining whether a match for the fingerprint is located in an entry in a fingerprint table with an identifier of an associated code version of the method, wherein the associated code version is one of a plurality of stored code versions of the method. Another aspect includes, based on determining that the match for the fingerprint is located in the entry in the fingerprint table, executing the associated code version of the method in response to the call to the method. Another aspect includes, based on determining that no match for the fingerprint is located in any entry in the fingerprint table: determining a new code version of the method by a compiler of the computer system; storing the fingerprint with an identifier of the new code version in a new entry in the fingerprint table; and executing the new code version in response to the call to the method.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
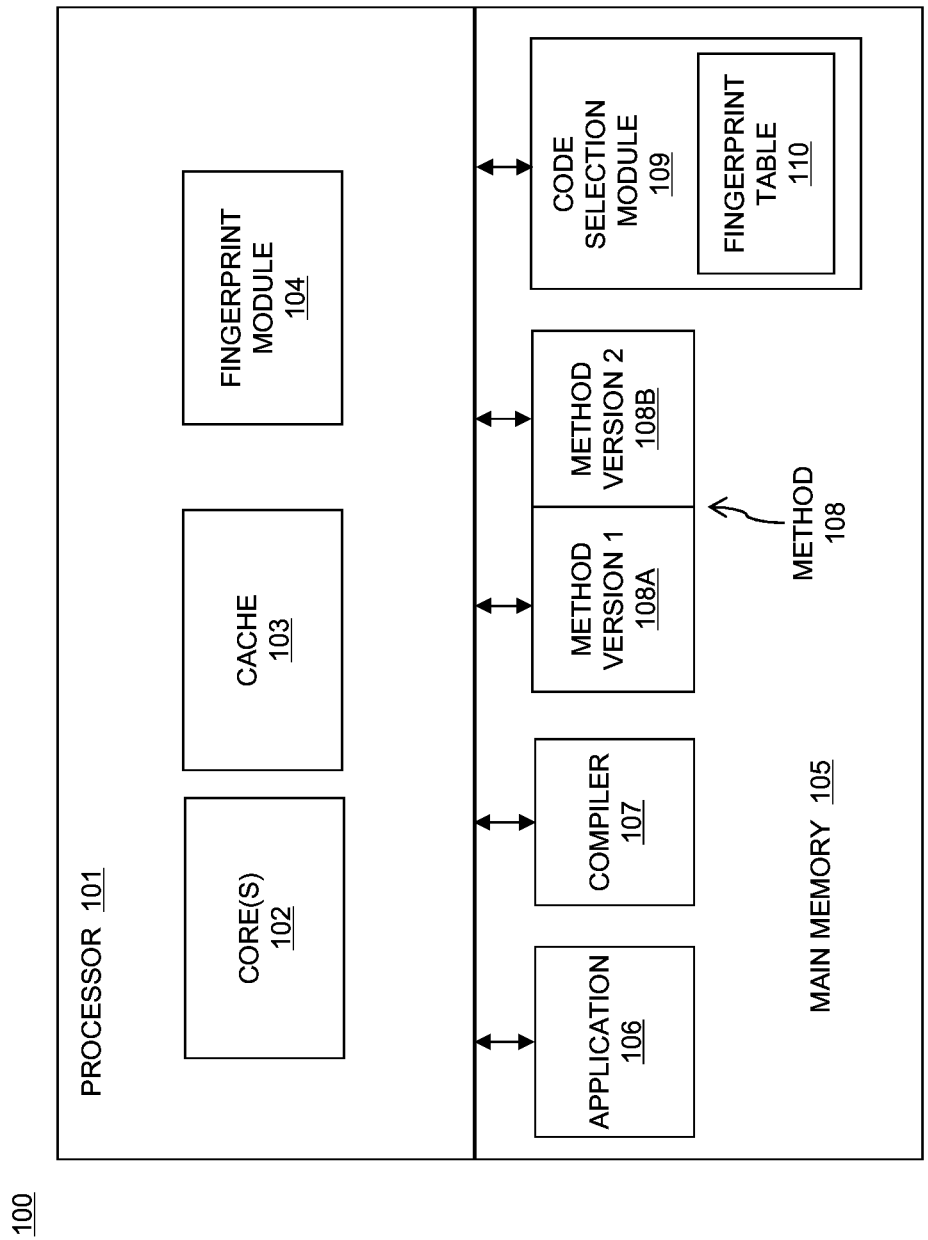
FIG. 1 depicts a computer system for fingerprint-based code version selection in accordance with an embodiment.

Embodiments of fingerprint-based code version selection are provided, with exemplary embodiments being discussed below in detail. A fingerprint of current workload behavior may be generated and used to select one of a plurality of saved code versions of a method for execution each time the method is called. The fingerprint gives the context of the calling program when the method is called. This enables the optimal coded version of the method to be used each time the method is called when the same context exists without the need to re-optimize the method by the compiler each time it is called. In some embodiments, the current fingerprint is evaluated whenever a method is called or whenever a particular program segment is executed. The fingerprint is then used to select a code version that has been previously been found to be optimal for the context of the program when the fingerprint was initially generated. The optimal code version is selected for a method by using the code fingerprint, without any need for any run-time optimization of the method code.

A fingerprint is a representation of specific processor behavior that occurs when a given code section of software is executing. The processor behavior may be any recognizable behavior in various embodiments. Examples of time-domain fingerprints include particular sequences of branch prediction hits and misses, a particular sequence of data cache hits and misses, or any other behavior or pattern recognizable by hardware. Further examples of time-domain code fingerprints include: data cache hit miss sequences (at various cache levels); data cache hit miss sequences subsequent to or leading up to a given instruction; data cache hit miss sequence for a specific set of loads identified by an instruction prefix; branch history value when a given instruction is executed; call signature or call signature history at a given instruction; and sequence of values of a come from address register (CFAR) of the processor at a given instruction. A fingerprint may also be based on steady-state conditions that include the following characteristics: average L1 data cache hit rate, L2 data cache hit rate, L3 data cache hit rate, average branch mispredict rate, average instruction fetch discard rate, and/or average instruction completion rate.

Various embodiments include a fingerprint recognition function, or fingerprint module. There may be a respective fingerprint recognition function for each type of fingerprint being detected. For example, a fingerprint detector that detects a specific sequence of load instruction data cache hits and misses may be implemented using a shift register that is referred to as a fingerprint register. Such a fingerprint register holds the sequence of the most-recent data cache hits and misses. A fingerprint register may be of arbitrary length in various embodiments, for example, 32 or 64 bits. The sequence of 1's and 0's in such a fingerprint register represent the most-recent history of load instruction data cache hits and misses, where a 0 indicates a data cache miss and a 1 indicates a data cache hit. Multiple shift registers may be included in the processor to provide other types of fingerprints, such as sequences of branches taken/not taken, sequences of branch prediction hit/misses, or sequences of data cache hit/misses for multiple cache levels. Further embodiments may generate a fingerprint that is based on a rate of occurrence of an event, such as the rate of load data cache misses over the previous 1000 load instructions, or the rate of branch prediction misses over the previous 1000 branch instructions. Further embodiments of a fingerprint may be generated based on function of multiple different fingerprints, using, for example, a sum or a difference of various fingerprints. Further embodiments of a fingerprint may be equal to the current calling context of the program or equal to the current value of the CFAR for the previous instance of a branch instruction. Any combination of different fingerprint types may be used in various embodiments.

Embodiments include a fingerprint table that is used to associate fingerprints with code versions of a method that are appropriate for various contexts under which the method is called. If the fingerprint table does not contain an entry corresponding to the current fingerprint of currently executing software, a code version is determined for the method in any appropriate manner; the code version may be determined based on the value of the current fingerprint in some embodiments. An entry into the table is then created to associate the fingerprint with the determined code version. Then, when software having the same fingerprint subsequently calls the method, the code version corresponding to the fingerprint in the entry is executed. Further embodiments may include multiple fingerprint tables corresponding to different methods.

Whenever a method is called, the existing fingerprint of the calling program is examined. The current fingerprint is then compared to the entries in the fingerprint table corresponding to previous calls of the method. The fingerprint table lists previously-encountered fingerprints and their corresponding just-in-time compiled (JITed) code versions for the method. There may be a plurality of fingerprint tables, each corresponding to a different method. If there is a match between the current fingerprint and one of the fingerprint table entries, then the method has already been optimized for that fingerprint, and the matching JITed version of the method is selected for execution in response to the current call. If there is no matching entry in the fingerprint table, then the method is optimized for the current fingerprint of the application. The optimized code version is stored so that it can be used again when the method is subsequently with the same current fingerprint, and a new fingerprint table entry is created. In further embodiments, the selection of JITed code version is based on a concatenation of fingerprints, for example, multiple level data cache hit/miss sequences and/or branch-related hit/miss sequences.

In some embodiments, when an exact match for the current fingerprint is not found in the fingerprint table, a relatively close match may be selected from the entries in the fingerprint table. Such embodiments include a fuzzy match detector that recognizes a match when the hamming distance between the current fingerprint and a fingerprint corresponding to a previous call of the method that is found in the fingerprint table is less than a certain value, or when it is less than the values for all other fingerprints in the fingerprint table for the method.

FIG. 1 depicts a computer system for implementing fingerprint-based processor parameter management in accordance with an embodiment. Computer system 100 includes a processor 101 in communication with a main memory 105. The processor 101 includes one or more cores 102 that execute instructions using cache memory 103. Computer programs, such as application 106 and method 108 (which may be part of, for example, a library), are stored in main memory 105 and executed by the processor 101. Any appropriate number of applications and methods may be executed by a computer system such as computer system 100. Compiler 107 comprises a just-in-time (JIT) compiler that generates different version of the method 108, e.g., method version 1 108A and method version 2 108B, based on the conditions of the execution of the method. Any appropriate number of code versions, corresponding to any appropriate number of methods, may be stored in main memory 105. An application such as application 106 may call the method 108, which triggers code selection module 109 to determine a particular version of the method 108 (e.g., method version 1 108A or method version 2 108B) to run in response to the call based on a current fingerprint that describes the behavior of the application 106 at the time of the call to the method 108. The code selection module 109 uses fingerprint table 110 and fingerprint module 104 to select the particular code version. Fingerprint table 110 stores fingerprints and associated code version identifiers for a particular method. The fingerprint module 104 may comprise a fingerprint register in some embodiments, and is used to determine the fingerprint of the workload that is currently executing on the processor 101. In various embodiments, a processor 101 may include a plurality of different fingerprint modules 104 that track different types of processor behavior (e.g., prefetch or branch prediction related behavior). Further, a plurality of fingerprint tables 110 may be stored in memory 105, each corresponding to a different respective method.

Figure 2:
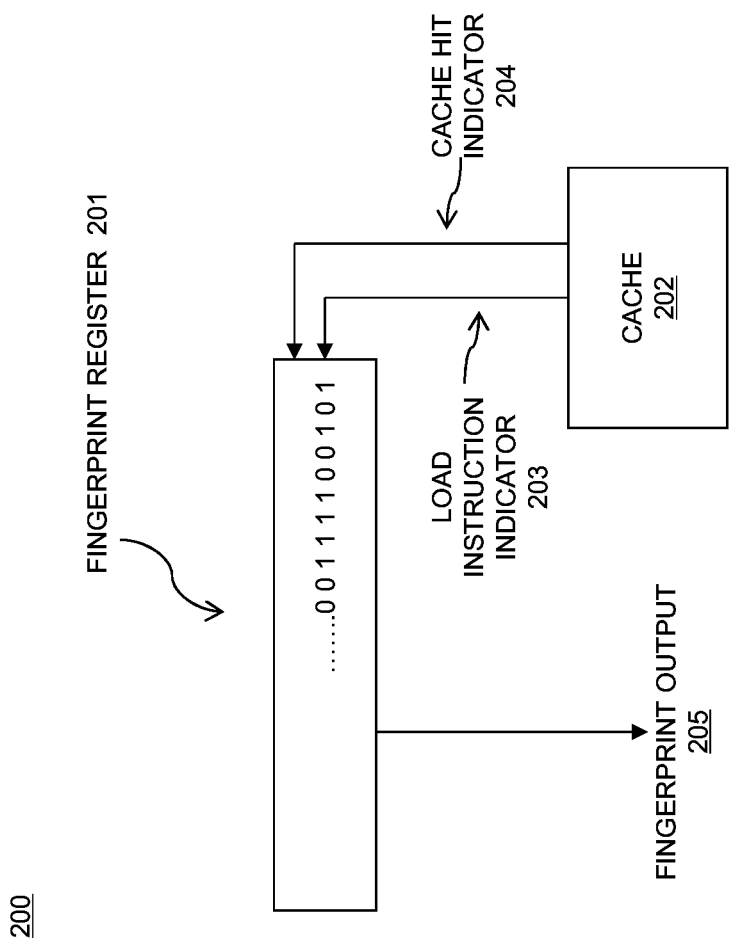
FIG. 2 depicts a fingerprint module in accordance with an embodiment.

FIG. 2 depicts a fingerprint module 200 in accordance with an embodiment. Fingerprint module 200 may comprise fingerprint module 104 in processor 101 of FIG. 1. Fingerprint module 200 is a hardware module comprising a fingerprint register 201 that is a shift register. As shown in FIG. 2, fingerprint register 201 receives input from a cache 202/103 via load instruction indicator 203 and cache hit indicator 204. A '1' is input into the shift register when there is a cache hit, and a '0' is loaded into the shift register when there is a cache miss (i.e., a load instruction with no cache hit). A fingerprint is output on fingerprint output 205; the fingerprint gives a snapshot of the cache hit/miss behavior of the current workload and may be used to identify a workload. The fingerprint register 201 may be of any appropriate size, and the fingerprint that is output on fingerprint output 205 may be the entire contents of the fingerprint register 201 in some embodiments. FIG. 2 is shown for illustrative purposes only; a fingerprint module comprising a shift register may measure any aspect of processor performance in various embodiments.

Figure 3:
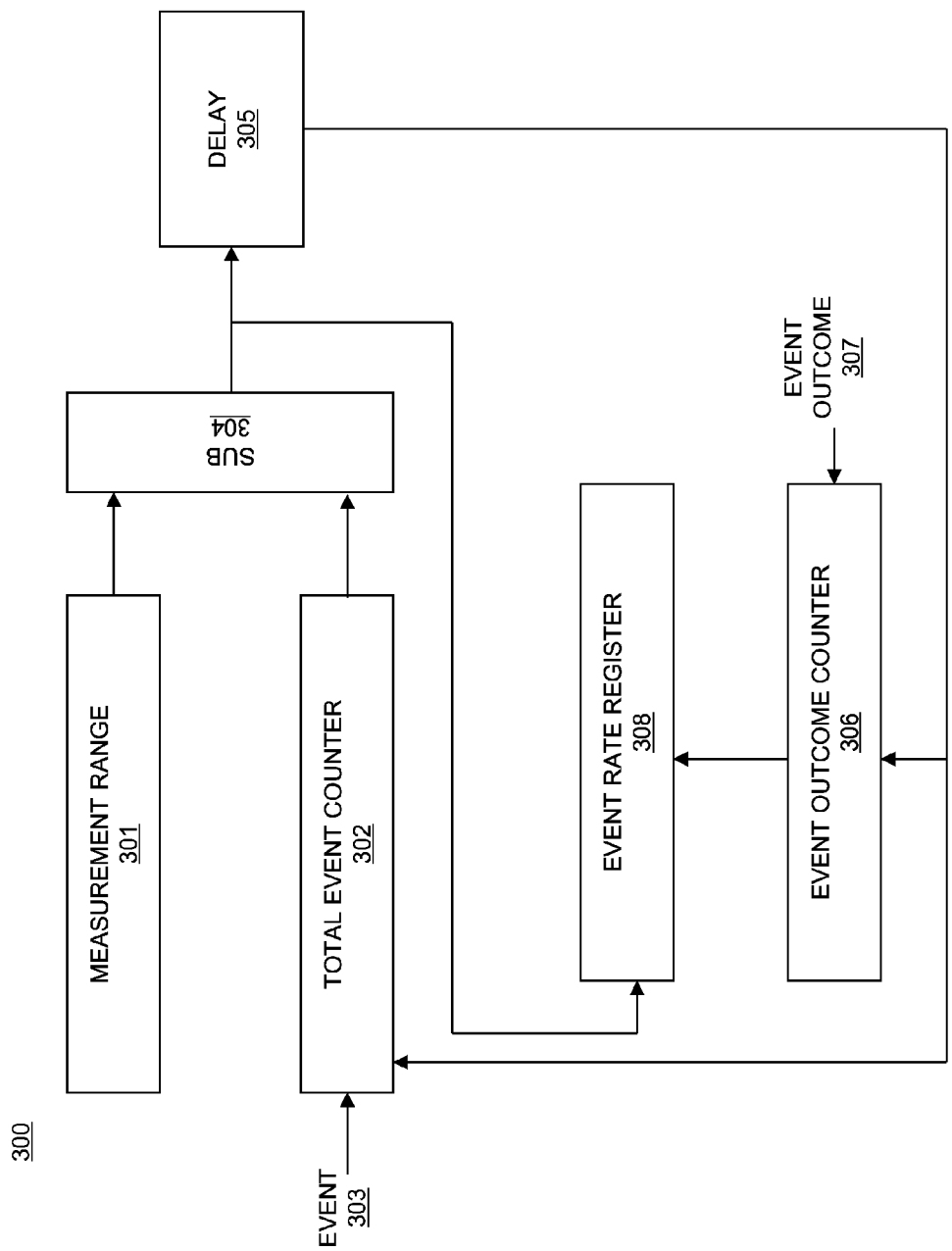
FIG. 3 depicts a fingerprint module in accordance with an embodiment.

FIG. 3 depicts a fingerprint module 300 in accordance with an embodiment. Fingerprint module 300 is a hardware module, and may comprise fingerprint module 104 in processor 101 of FIG. 1. In fingerprint module 300, the event outcome counter 306 counts each time the event (e.g. a load data cache miss) whose rate is being measured by the fingerprint module 300 occurs, as indicated by event outcome input 307. The total event counter 302 counts the total number of loads or instructions that occur, as indicated by event input 303. The measurement range 301 gives a number of events over which the rate is being measured (e.g. every 1000 loads, or every 1000 instructions, etc.). Whenever the total event counter 302 reaches the number of events over which the rate is being measured as given by measurement rage 301, the subtractor module 304 outputs a signal to the event rate register 308 and delay module 305. The current value of the event outcome counter 306 is gated into event rate register 308 based on the signal from the subtractor module 304. Then, the total event counter 302 and event outcome counter 306 are reset based on the signal from delay module 305. The value in the event rate register 308 therefore represents the rate at which the event being measured has occurred during the number of instructions over which the rate is being measured. The value in event rate register 308 may be used as a fingerprint, or as part of a fingerprint in conjunction with another fingerprint module output. FIG. 3 is shown for illustrative purposes only; a fingerprint module comprising a rate measurement module may measure any aspect of processor performance in various embodiments.

Figure 4:
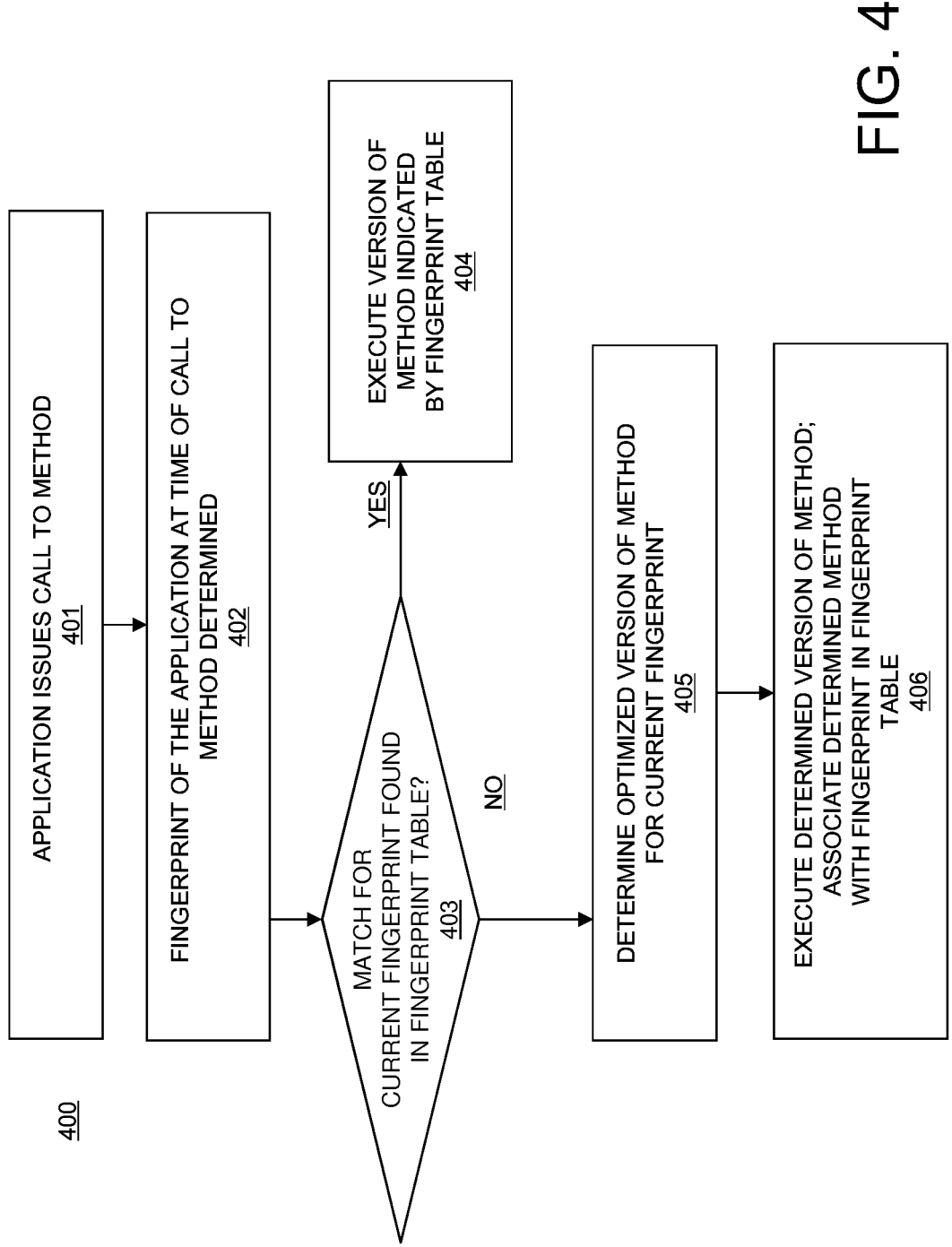
FIG. 4 depicts a process flow for fingerprint-based code version selection in accordance with an embodiment.

FIG. 4 depicts a method 400 for processor parameter management using fingerprints in accordance with an embodiment. FIG. 4 is discussed with respect to FIG. 1. First, in block 401, an application 106 that is being executed by processor 101 calls a method 108, and code selection module 109 is triggered. Next, in block 402, the fingerprint of the application 106 at the time when the call to the method 108 occurred is determined by code selection module 109 based on one or more fingerprint modules such as fingerprint module 104. The fingerprint represents the historical behavior of the processor leading up to the point at which the method was called, and determination may comprise reading the current value of a fingerprint register 201 and/or an event rate register 308. The fingerprint module(s) may indicate any aspect of the behavior of processor 101. The fingerprint module that are used to determine the current fingerprint in block 402 may comprise any of fingerprint module 200 of FIG. 2 and fingerprint module 300 of FIG. 3. Further, a computer system may include multiple fingerprint modules that measure different execution behavior, for example prefetching or branch prediction related behavior. Next, in block 403, it is determined whether a match for the current fingerprint (i.e. that was determined in block 402) is located in an entry in fingerprint table 110. The fingerprint table 110 corresponds to the particular method that was called in block 401. In some embodiments, if no exact match exists for the current fingerprint in the fingerprint table 110, an entry comprising a fuzzy match may be determined in the fingerprint table 110 for the current fingerprint. The fuzzy matching entry may be determined based on a hamming distance between the current fingerprint and a fingerprint that is found in the fingerprint table 110 being less than a certain value, or when it the distance value for a particular entry less than the values for all other entries in the fingerprint table 110 for the method.

If a match was found in block 403 for the current fingerprint in an entry in the fingerprint table 110, then, in block 404, the associated code version of the method that is indicated by the entry in the fingerprint table is executed (e.g., one of method version 1 108A or method version 2 108B) in response to the call of block 401. If it was determined in block 403 that no match for the current fingerprint is in the fingerprint table 110, flow proceeds from block 403 to block 405. In block 405, an optimized version of the method 108 for the current fingerprint of the application 106 is determined and generated by compiler 107. The optimized version of the method 108 may be determined in any appropriate manner. Lastly, in block 406, an identifier of the determined optimized code version of the method 108 from block 405 is written into an entry in the fingerprint table 110 with the current fingerprint. The optimized code version is also stored in memory 105 for future reuse, and is executed by processor 101 in response to the method call of block 401.

Technical effects and benefits include improved performance in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for fingerprint-based code version selection, the method comprising:
    based on a call to a method being issued by calling software that is currently executing on a processor of a computer system, determining a fingerprint of the calling software, the fingerprint comprising a representation of a sequence of behavior that occurs in the processor while the calling software is executing;
    determining whether a match for the fingerprint is located in an entry in a fingerprint table with an identifier of an associated code version of the method, wherein the associated code version is one of a plurality of stored code versions of the method;
    based on determining that the match for the fingerprint is located in the entry in the fingerprint table, executing the associated code version of the method in response to the call to the method; and
    based on determining that no match for the fingerprint is located in any entry in the fingerprint table:
        determining a new code version of the method by a compiler of the computer system;
        storing the fingerprint with an identifier of the new code version in a new entry in the fingerprint table; and
        executing the new code version in response to the call to the method.

2. The method of claim 1, wherein determining the fingerprint comprises tracking an event in the processor by a fingerprint register, wherein the fingerprint register holds a sequence of ones and zeros indicating different outcomes of the tracked event.

3. The method of claim 2, wherein the event comprises a cache access, wherein the different outcomes comprise cache hits and cache misses.

4. The method of claim 2, wherein the event comprises branch prediction, wherein the different outcomes comprise correct branch predictions and incorrect branch predictions.

5. The method of claim 2, wherein the processor comprises a plurality of fingerprint registers, each fingerprint register configured to track a different event in the processor.

6. The method of claim 1, wherein determining the fingerprint comprises tracking a rate of occurrence of an event outcome for an event in the processor by a fingerprint module, wherein the fingerprint module counts a number of occurrences of the event outcome over a predetermined number of occurrences of the event.

7. The method of claim 1, wherein determining whether the match for the fingerprint is located in the entry in a fingerprint table comprises determining a closest match for the fingerprint based on a hamming distance between the fingerprint and a plurality of fingerprints listed in the fingerprint table.

8. A computer program product for implementing fingerprint-based code version selection, the computer program product comprising:
    a computer readable storage medium having program instructions embodied therewith, the program instructions readable by a processing circuit to cause the processing circuit to perform a method comprising:
    based on a call to a method being issued by calling software that is currently executing on a processor of a computer system, determining a fingerprint of the calling software, the fingerprint comprising a representation of a sequence of behavior that occurs in the processor while the calling software is executing;
    determining whether a match for the fingerprint is located in an entry in a fingerprint table with an identifier of an associated code version of the method, wherein the associated code version is one of a plurality of stored code versions of the method;
    based on determining that the match for the fingerprint is located in the entry in the fingerprint table, executing the associated code version of the method in response to the call to the method; and
    based on determining that no match for the fingerprint is located in any entry in the fingerprint table:
        determining a new code version of the method by a compiler of the computer system;
        storing the fingerprint with an identifier of the new code version in a new entry in the fingerprint table; and
        executing the new code version in response to the call to the method.

9. The computer program product of claim 8, wherein determining the fingerprint comprises tracking an event in the processor by a fingerprint register, wherein the fingerprint register holds a sequence of ones and zeros indicating different outcomes of the tracked event.

10. The computer program product of claim 9, wherein the event comprises a cache access, wherein the different outcomes comprise cache hits and cache misses.

11. The computer program product of claim 9, wherein the event comprises branch prediction, wherein the different outcomes comprise correct branch predictions and incorrect branch predictions.

12. The computer program product of claim 9, wherein the processor comprises a plurality of fingerprint registers, each fingerprint register configured to track a different event in the processor.

13. The computer program product of claim 8, wherein determining the fingerprint comprises tracking a rate of occurrence of an event outcome for an event in the processor by a fingerprint module, wherein the fingerprint module counts a number of occurrences of the event outcome over a predetermined number of occurrences of the event.

14. The computer program product of claim 8, wherein determining whether the match for the fingerprint is located in the entry in a fingerprint table comprises determining a closest match for the fingerprint based on a hamming distance between the fingerprint and a plurality of fingerprints listed in the fingerprint table.

15. A computer system for fingerprint-based code version selection, the system comprising:
 a memory; and
 a processor, communicatively coupled to said memory, the computer system configured to perform a method comprising:
  based on a call to a method being issued by calling software that is currently executing on the processor of the computer system, determining a fingerprint of the calling software, the fingerprint comprising a representation of a sequence of behavior that occurs in the processor while the calling software is executing;
  determining whether a match for the fingerprint is located in an entry in a fingerprint table with an identifier of an associated code version of the method, wherein the associated code version is one of a plurality of stored code versions of the method;
  based on determining that the match for the fingerprint is located in the entry in the fingerprint table, executing the associated code version of the method in response to the call to the method; and
  based on determining that no match for the fingerprint is located in any entry in the fingerprint table:
   determining a new code version of the method by a compiler of the computer system;
   storing the fingerprint with an identifier of the new code version in a new entry in the fingerprint table; and
   executing the new code version in response to the call to the method.

16. The computer system of claim 15, wherein determining the fingerprint comprises tracking an event in the processor by a fingerprint register, wherein the fingerprint register holds a sequence of ones and zeros indicating different outcomes of the tracked event.

17. The computer system of claim 16, wherein the event comprises a cache access, wherein the different outcomes comprise cache hits and cache misses.

18. The computer system of claim 16, wherein the event comprises branch prediction, wherein the different outcomes comprise correct branch predictions and incorrect branch predictions.

19. The computer system of claim 15, wherein determining the fingerprint comprises tracking a rate of occurrence of an event outcome for an event in the processor by a fingerprint module, wherein the fingerprint module counts a number of occurrences of the event outcome over a predetermined number of occurrences of the event.

20. The computer system of claim 15, wherein determining whether the match for the fingerprint is located in the entry in a fingerprint table comprises determining a closest match for the fingerprint based on a hamming distance between the fingerprint and a plurality of fingerprints listed in the fingerprint table.

* * * * *